United States Patent [19]

Dai et al.

[11] Patent Number: 4,941,964

[45] Date of Patent: Jul. 17, 1990

[54] HYDROTREATMENT PROCESS EMPLOYING CATALYST WITH SPECIFIED PORE SIZE DISTRIBUTION

[75] Inventors: Pei-Shing E. Dai; David E. Sherwood, Jr.; Burton H. Bartley, all of Port Arthur; Randall H. Petty, Winnie, all of Tex.

[73] Assignee: Texaco Inc., White Plains, N.Y.

[21] Appl. No.: 168,095

[22] Filed: Mar. 14, 1988

[51] Int. Cl.$^5$ .................... C10G 17/00; C10G 45/00
[52] U.S. Cl. .................... 208/216 PP; 208/216 R; 208/251 H; 208/251 R; 208/254 H; 208/209; 208/213
[58] Field of Search ............ 208/251 H, 216 PP

[56] References Cited

U.S. PATENT DOCUMENTS

| | | | |
|---|---|---|---|
| 3,692,698 | 9/1972 | Riley et al. | 502/220 |
| 3,770,617 | 11/1973 | Riley et al. | 208/216 PP |
| 3,876,523 | 4/1975 | Rosinski et al. | 208/216 PP |
| 4,048,060 | 9/1977 | Riley | 208/216 R |
| 4,051,021 | 9/1977 | Hamner | 208/216 R |
| 4,066,574 | 1/1978 | Tamm | 208/216 R |
| 4,082,695 | 4/1978 | Rosinski et al. | 502/220 |
| 4,089,774 | 5/1978 | Oleck et al. | 208/216 R |
| 4,297,242 | 10/1981 | Hensley, Jr. et al. | 208/216 PP |
| 4,306,965 | 12/1981 | Hensley, Jr. et al. | 208/216 PP |
| 4,309,278 | 1/1982 | Sawyer | 208/216 PP |
| 4,328,127 | 5/1982 | Angevine et al. | 208/216 PP |
| 4,341,625 | 7/1982 | Tamm | 208/216 PP |
| 4,395,328 | 7/1983 | Hensley, Jr. et al. | 208/216 PP |
| 4,648,963 | 3/1987 | Kutes et al. | 208/251 H |
| 4,652,545 | 3/1987 | Lindsley et al. | 208/216 PP |
| 4,729,826 | 3/1988 | Lindsay et al. | 208/251 H |
| 4,738,944 | 4/1988 | Robinson et al. | 208/251 H |

*Primary Examiner*—H. M. S. Sneed
*Assistant Examiner*—Helane Myers
*Attorney, Agent, or Firm*—Robert A. Kulason; James J. O'Loughlin; Louis S. Sorell

[57] ABSTRACT

A process for the hydrotreatment of a sulfur and metal-containing hydrocarbon feed comprises contacting said feed with hydrogen and a catalyst in a manner such that the catalyst is maintained at isothermal conditions and is exposed to a uniform quality of feed, where said catalyst has a composition comprising 3.0–5.0 wt. % of an oxide of a Group VIII metal, 14.5–24.0 wt. % of an oxide of a Group VIB metal and 0–2.0 wt. % of an oxide of phosphorus supported on a porous alumina support, and said catalyst is further characterized by having a total surface area of 150–210 m$^2$/g and a total pore volume of 0.50–0.75 cc/g with a pore diameter distribution such that micropores having diameters of 100–160A constitute 70–85% of the total pore volume of said catalyst and macropores having diameters of greater than 250A constitute 5.5–22.0% of the total pore volume of said catalyst. The process of the instant invention is particularly effective in achieving desired levels of hydrodesulfurization in the fraction of hydrotreated/hydrocracked petroleum resid product having a boiling point greater than 1000° F.

18 Claims, 8 Drawing Sheets

HYDROTREATMENT PROCESS EMPLOYING CATALYST WITH SPECIFIED PORE SIZE DISTRIBUTION

BACKGROUND OF THE INVENTION

1. Field of the Invention

This invention relates to a process for the catalytic hydrotreatment of a sulfur- and metal-containing hydrocarbon feedstock. More particularly, this invention relates to a process for the catalytic hydrotreatment of a sulfur- and metal-containing hydrocarbon feed which comprises contacting the feed with hydrogen and a catalyst having a specified pore size distribution in a manner such that the catalyst is maintained at isothermal conditions and is exposed to a uniform quality of feed. The process of the instant invention is particularly effective in achieving desired levels of hydrodesulfurization in the fraction of hydrotreated/hydrocracked petroleum resid product having a boiling point greater than 1000° F.

2. Information Disclosure Statement

The use of catalytic hydrotreatment processes to treat hydrocarbon feedstocks, particularly petroleum residua, to achieve hydrodesulfurization (HDS), hydrodenitrogenation (HDN), and hydrodemetalation (HDM) (particularly including removal of nickel compounds (HDNi), and vanadium compounds (HDV)), is well known to those skilled in the art. Many of these processes employ hydrotreating catalysts with specified proportions or ranges of proportions of pores having relatively small diameters (i.e. micropores, herein defined as pores having diameters less than 250A) and pores having relatively large diameters (i.e. macropores, herein defined as pores having diameters greater than 250A). Examples of such catalysts include the following:

U.S. Pat. No. 4,652,545 (Lindsley et al.) discloses a catalyst composition useful in the hydroconversion of heavy oils, the catalyst containing 0.5–5% Ni or Co and 1.8–18% Mo (calculated as the oxides) on a porous alumina support, having 15–30% of the Ni or Co in an acid extractable form, and further characterized by having a Total Pore Volume (TPV) of 0.5–1.5 cc/g with a pore diameter distribution such that (i) at least 70% TPV is in pores having 80–120A diameters, (ii) less than 0.03 cc/g of TPV is in pores having diameters of less than 80A, and (iii) 0.05–0.1 cc/g of TPV is in pores having diameters of greater than 120A. Lindsley et al. is distinguished from the instant invention in that its catalyst restricts the pore volume in pores with diameters ≧120A to 0.05 to 0.10 cc/g, whereas the catalyst employed in the instant invention typically contain 0.30 to 0.50 cc/g in this region;

U.S. Pat. No. 4,395,328 (Hensley, Jr. et al.) discloses a process for the conversion of a hydrocarbon stream containing asphaltenes and a substantial amounts of metals, comprising contacting the stream (in the presence of hydrogen) with a catalyst present in one or more fixed or ebullating beds, the catalyst comprising at least one metal which may be a Group VIB or Group VIII metal, an oxide of phosphorus, and an alumina support, where the alumina support material initially had at least 0.8 cc/gm of TPV in pores having diameters of 0–1200A, and at least 0.1 cc/gm of TPV is in pores having diameters of 1200–50,000A, and the support material was heated with steam to increase the average pore diameter of the catalyst support material. Hensley, Jr. et al. ('328) is distinguished from the instant invention in that its catalyst requires a minimum pore volume in pores with diameters >1200A to be 0.10 cc/g, whereas the metals-free supports of the catalysts employed in the instant invention typically contain 0.02 to 0.08 cc/g in this region. In addition, it requires the steaming of a support containing not less than 5 wt % phosphorus oxides prior to metals impregnation, whereas the supports for the catalysts employed in the instant invention are formed without phosphorus, said element being added in the range of 0.0 to 2.0 wt % $P_2O_5$ during the metals impregnation step;

U.S. Pat. No. 4,341,625 (Tamm) discloses a process for hydrodesulfurizing a metal-containing hydrocarbon feedstock which comprises contacting the feedstock with a catalyst comprising at least one hydrogenation agent (i.e. Group VIB or Group VIII metals, or combinations thereof) on a porous support, the catalyst being further characterized by having a TPV of 0.5–1.1 cc/g with at least 70% TPV in pores having diameters of 80–150A and less than 3% TPV in pores having diameters greater than 1000A. Tamm ('625) is distinguished from the instant invention in that the catalyst of Tamm restricts the pore volume in pores with diameters ≧1000A to less than 3% TPV, whereas the catalyst employed in the instant invention typically contain 4% to 10% TPV in this region;

U.S. Pat. No. 4,328,127 (Angevine et al.) discloses a catalyst composition for use in the hydrodemetalation-desulfurization of residual petroleum oils, the catalyst comprising a hydrogenating component (i.e. Group VI or Group VIII metals, or combinations thereof) on a porous support, and being further characterized by having a TPV of 0.45–1.5 cc/g with 40–75% TPV in pores having diameters of 150–200A, and up to 5% TPV in pores having diameters of greater than 500A. Angevine is distinguished from the instant invention in that Angevine requires that the catalyst pore volume in pores with diameters between 150A to 200A be 40–75% TPV, whereas the catalyst employed in the instant invention typically contains from 3% to 9% TPV in this region.

U.S. Pat. No. 4,309,278 (Sawyer) discloses a process for the hydroconversion of a hydrocarbon feedstock comprising contacting the feedstock with hydrogen and a catalyst in a fixed bed, moving bed, ebullating bed, slurry, disperse phase, or fluidized bed reactor, where the catalyst comprises a hydrogenation component (i.e. Group VIB or Group VIII metals) on a porous support, and is further characterized by having a TPV of 1.0–2.5 cc/g with no more than 0.05–0.20 cc/g of TPV in pores having diameters of greater than 400A. Sawyer is distinguished from the instant invention in that Sawyer requires a catalyst TPV between 1.0 and 2.5 cc/g for the "beaded" catalyst support, whereas the supports of the catalysts employed in the instant invention have TPVp's ≦0.9 cc/g. In addition, the catalyst employed in the instant invention uses an "extruded" rather than "beaded" support;

U.S. Pat. No. 4,306,965 (Hensley, Jr. et al.) discloses a process for the hydrotreatment of a hydrocarbon stream comprising contacting the stream with hydrogen and a catalyst, the catalyst comprising chromium, molybdenum, and at least one Group VIII metal on a porous support, and further characterized by having a TPV of 0.4–0.8 cc/g with 0–50% TPV in pores having diameters smaller than 50A, 30–80% TPV in pores having diameters of 50–100A, 0–50% TPV in pores having diameters of 100–150A, and 0–20% TPV in pores having diameters greater than 150A. Hensley, Jr. et al. ('965) is distinguished from the instant invention in that Hensley, Jr., requires that 30% to 80% catalyst TPV be in pores with diameters between 50A to 100A, whereas the catalysts employed in the instant invention typically contain 6% to 11% TPV in this range. Furthermore, it also requires that 0% to 50% TPV be in pores with diameters between 100A to 150A, whereas the catalysts of the instant invention typically contain from 66% to 81% TPV in this region. Hensley, Fr. et al. ('965) also requires the presence of chromium on the catalyst which the instant invention does not;

U.S. Pat. No. 4,297,242 (Hensley, Jr. et al.) discloses a b 2-stage process for the catalystic hydrotreatment of hydrocarbon streams containing metals and sulfur compounds, the process comprising: (i) first contacting the feedstock with hydrogen and a demetalation catalyst comprising a Group VIB and/or Group VIII metal; and (ii) thereafter reacting the effluent with a catalyst consisting essentially of at least one Group VIB metal on a porous support, and having a TPV of 0.4–0.9 cc/g and a pore size distribution such that pores having diameters of 50–80A constitute less than 40% TPV, pores having diameters of 80–100A constitute 15–65% TPV, pores having diameters of 100–130A constitute 10–50% TPV, and pores having diameters of greater than 130A constitute less than 15% TPV. Hensley, Jr. ('242) is distinguished from the instant invention in that it requires a two-stage process to achieve the disclosed levels of hydrotreatment, whereas the instant invention achieves the disclosed levels of hydrotreatment in a single stage process and is also suitable for use in a multistage process. In addition, Hensley, Jr. ('242) is distinguished from the instant invention in that it restricts the pore volume in pores with diameters $\geq$130A to less than 15% TPV, whereas the catalysts employed in the instant invention typically contain from 35% to 50% in this region;

U.S. Pat. No. 4,089,774 (Oleck et al.) discloses a process for the demetalation and desulfurization of a hydrocarbon oil comprising contacting the oil with hydrogen and a catalyst, the catalyst comprising a Group VIB metal and an iron group metal (i.e. iron, cobalt, or nickel) on a porous support, and having a TPV of 0.4–0.65 cc/g with at least 10% TPV in pores having diameters of less than 30A, at least 45% TPV in pores having diameters of 30–150A, and at least 15% TPV in pores having diameters greater than 300A. Oleck is distinguished from the instant invention in that it requires that at least 15% catalyst TPV be in pores with diameters $\geq$300A, whereas the catalysts employed in the instant invention typically have 5% to 14% TPV in this region. In addition, Oleck requires the incorporation of Delta and/or Theta phase alumina, whereas the catalysts employed in the instant invention do not;

U.S. Pat. No. 4,082,695 (Rosinski et al.) discloses a catalyst for use in the demetalation and desulfurization of petroleum oils, the catalyst comprising a hydrogenating component (e.g. cobalt and molybdenum) on a porous support, and having a surface area of 110–150 m²/g and pore size distribution such that at least 60% TPV is in pores having diameters of 100–200A and not less than 5% TPV is in pores having diameters greater than 500A. Rosinski et al. ('695) is distinguished from the instant invention in that it requires a relatively low surface area of 110 to 150 m²/g, whereas the catalysts employed in the instant invention have surface areas in the range of 150 to 210 m²/g. Furthermore, whereas Rosinski et al. ('695) specifies a broad micropore volume indicated by the criteria of at least 60% TPV in pores with diameters between 100A and 200A, the catalysts employed in the instant invention require 70% to 85% TPV in pores with diameters between 100A and 160A;

U.S. Pat. No. 4,066,574 (Tamm) discloses a catalyst composition useful in the hydrodesulfurization of a hydrocarbon feedstock containing organometallic compounds, the catalyst comprising Group VIB and Group VIII metal components on a porous support, and having a TPV of 0.5–1.1 cc/g with a pore diameter distribution such that at least 70% TPV is in pores of diameters of 80–150A and less than 3% TPV is in pores having diameters greater than 1000A. Tamm ('574) is distinguished from the instant invention in that it limits the catalyst pore volume of pores with diameters $\geq$1000A to less than 3% TPV, whereas the catalysts employed in the instant invention typically contain from 3% to 10% in this region;

U.S. Pat. No. 4,051,021 (Hamner) discloses a catalytic process for the hydrodesulfurization of a hydrocarbon feed which comprises contacting the feed with hydrogen and a catalyst, the catalyst comprising a Group VIB and Group VIII metal on a porous support, and having a TPV of 0.3–1.0 cc/g with a pore diameter distribution such that greater than 50% TPV is in pores of diameters of 70–160A, and pore diameters below 70A and above 160A are minimized. Hamner is distinguished from the instant invention in that the catalyst employed in the instant invention must have macropores constituting 5.5–22.0% TPV having diameters of greater than 250A, whereas in Hamner a catalyst having 10% TPV residing in pores having a diameter of greater than 200A is only marginally effective, with 0% TPV in diameters of greater than 200A being preferred. Thus Hamner discloses an essentially monomodal catalyst with no macroporosity;

U.S. Pat. No. 4,048,060 (Riley) discloses a two-stage process for hydrodesulfurizing a heavy hydrocarbon feed which comprises: (i) contacting the feed with hydrogen and a first catalyst to produce a first hydrodesulfurized hydrocarbon product, the first catalyst comprising a Group VIB and Group VIII metal on a porous support and having a mean pore diameter of 30–60A; and (ii) contacting the first hydrodesulfurized hydrocarbon product with hydrogen and a second catalyst under hydrodesulfurization conditions, the second catalyst comprising a Group VIB and Group VIII metal on a porous support and being further characterized by having a TPV of 0.45–1.50 cc/g with 0–0.5 cc/g of TPV in pores having diameters greater than 200A, 0–0.05 cc/g of TPV in pores having diameters below 120A, and at least 75% TPV in pores having diameters $\pm$10A of a mean pore diameter of 140–190A. Riley ('060) is distinguished from the instant invention in that it requires a two-stage process to achieve the disclosed degree of hydrotreatment, whereas the instant invention achieves disclosed levels of hydrotreatment in a single stage process although it is also suitable for use in a multistage process. In addition, Riley ('060) requires a small pore catalyst in the first stage with a mean pore diameter of 30A to 60A, whereas the catalysts employed in the instant invention have median pore diameters of 120A to 130A. Riley ('060) also requires a large pore catalyst in the second stage with a pore volume of 0.0 to 0.05 cc/g in pores with diameters less than 120A, whereas the catalysts employed in the instant invention have 0.20 to 0.30 cc/g in this region;

U.S. Pat. No. 3,876,523 (Rosinski et al.) discloses a process for the demetalizing and desulfurizing of residual petroleum oil comprising contacting the oil with hydrogen and a catalyst, the catalyst comprising a Group VIB and Group VIII metal on a porous support and having a pore size distribution such that greater than 60% TPV is in pores having diameters of 100–200A, at least 5% TPV is in pores having diameters greater than 500A, and 10% TPV or less is in pores having diameters less than 40A, and the surface area of the catalyst is 40–150 m$^2$/g. Rosinski et al. ('523) is distinguished from the instant invention in that it requires a relatively low surface area of 40 to 150 m$^2$/g, whereas the catalysts employed in the instant invention require a surface area of 150 to 210 m$^2$/g;

U.S. Pat. No. 3,770,617 (Riley et al.) discloses a process for the desulfurization of a petroleum hydrocarbon feed comprising contacting the feed with hydrogen and a catalyst, the catalyst comprising a Group VIB or Group VIII metal on a porous support and having greater than 50% TPV in pores having diameters of 30–80A, less than 4% TPV in pores having diameters of 200–2000A, and at least 3% TPV in pores having diameters greater than 2000A. Riley et al. ('617) is distinguished from the instant invention in that it requires that greater than 50% TPV be in pores with diameters between 30A and 80A, whereas the catalysts employed in the instant invention typically have 2% to 3% TPV in this region; and U.S. Pat. No. 3,692,698 (Riley et al.) discloses a catalyst useful in hydroprocessing of heavy feed stocks, the catalyst comprising a mixture of Group VIB and Group VIII metals on a porous support and having a pore size distribution such that a major portion of its TPV is in pores of diameters ranging from 30–80A, less than 4% TPV is in pores of diameters of 200–2000A, and at least 3% TPV is in pores of diameters greater than 2000A. Riley et al. ('698) is distinguished from the instant invention in that it requires that the major portion of TPV be in pores with diameters between 30A and 80A, whereas the catalysts employed in the instant invention have the major portion of TPV in pores with diameters between 100A and 160A.

SUMMARY OF THE INVENTION

The instant invention is a process for the hydrotreatment of a sulfur and metal-containing hydrocarbon feed which comprises contacting the feed with hydrogen and a catalyst in a manner such that the catalyst is maintained at isothermal conditions and is exposed to a uniform quality of feed, where the catalyst has a composition comprising 3.0–5.0, preferably 3.0–3.5 wt. % of an oxide of a Group VIII metal, preferably nickel or cobalt, 14.5–24.0, preferably 14.5–15.5 wt. % of an oxide of a Group VIB metal, preferably tungsten or molybdenum, and 0–2.0, preferably less than 0.2 wt. % of an oxide of phosphorus, preferably P$_2$O$_5$, all supported on a porous alumina support. The catalyst is further characterized by having a total surface area of 150–210 m$^2$/g, preferably 180–210 m$^2$/g, and a total pore volume of 0.50–0.75 cc/g, preferably 0.60–0.70 cc/g, with a pore diameter distribution such that micropores having diameters of 100–160A constitute 70–85% of the total pore volume of the catalyst and macropores having diameters of greater than 250A constitute 5.5–22.0%, preferably 7–16% of the total pore volume of the catalyst.

The feed may be contacted with hydrogen and the catalyst by any means which insures that the catalyst is maintained at isothermal conditions and exposed to a uniform quality of feed. Preferred means for achieving such contact include contacting the feed with hydrogen and the prescribed catalyst in a single continuous stirred tank reactor or single ebullated bed reactor, or in a series of 2–5 continuous stirred tank or ebullated bed reactors, with ebullated bed reactors being particularly preferred. The process of the instant invention is particularly effective in achieving desired levels of HDS in the fraction of hydrotreated/hydrocracked petroleum resid product having a boiling point greater than 1000° F.

DETAILED EMBODIMENTS OF THE INVENTION

Figure 1:
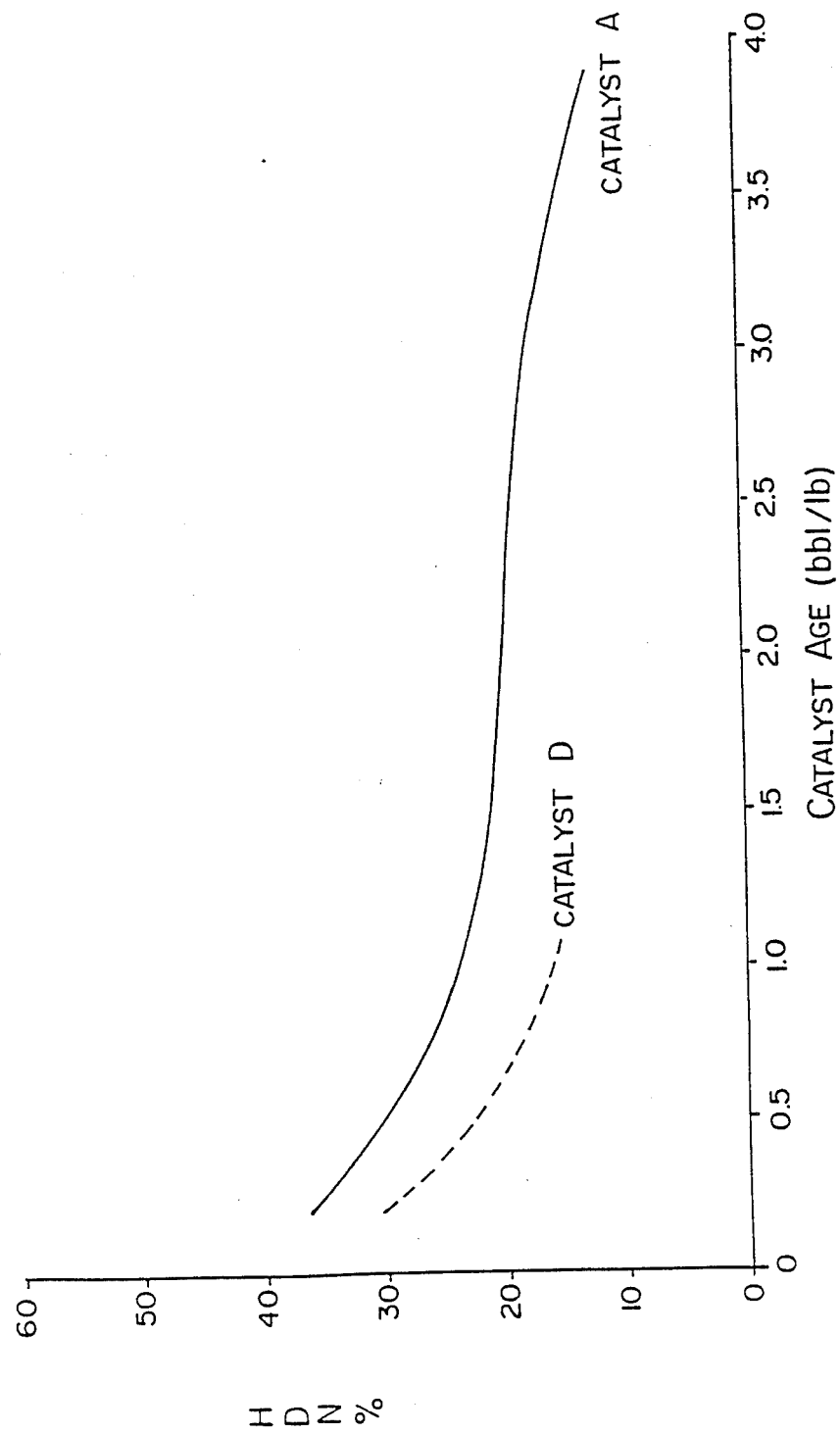
FIG. 1 (Robinson Reactor Data Corrected HDN of Total Liquid Product) illustrates data obtained comparing hydrodenitrogenation (HDN) of total liquid product of a hydrotreated hydrocarbon feedstock obtained via a process employing a commercial hydrotreatment catalyst and the process of the instant invention.

Early petroleum distillate hydrotreating catalysts generally were monomodal catalysts with very small micropore diameters (less than say 100A) and rather broad pore size distributions. First generation petroleum resid hydrotreating catalysts were developed by introducing a large amount of macroporosity into a distillate hydrotreating catalyst pore structure to overcome the diffusion resistance of large molecules. Such catalysts, which are considered fully bimodal HDS/HDM catalysts, are exemplified by U.S. Pat. Nos. 4,395,328 and 4,089,774, supra.

Another approach to developing improved catalysts for petroleum resid processing has involved enlarging the micropore diameter of essentially monomodal catalysts with no significant macroporosity to overcome the abovedescribed diffusion limitations. Essentially monomodal catalysts with small micropore diameters and low macroporosity designed for improved petroleum resid HDS include those disclosed by U.S. Pat. Nos. 4,652,545; 4,341,625; 4,309,278; 4,306,965; 4,297,242; 4,066,574; 4,051,021; 4,048,060 (1st stage catalyst); 3,770,617; and 3,692,698, supra. Essentially monomodal catalysts with larger micropore diameters and low macroporosity designed for improved petroleum resid HDM include those disclosed by U.S. Pat. Nos. 4,328,127; 4,309,278; 4,082,695; 4,048,060 (2nd stage catalyst); and 3,876,523, supra.

However, none of the abovedescribed catalyst types have been found effective for HDS of petroleum bottoms (i.e. the product of a hydrotreated petroleum resid having a boiling point greater than say 1000° F.). The catalyst employed in the process of the instant invention has micropore diameters intermediate between the abovedescribed monomodal HDS and HDM catalysts, as well as sufficient macroporosity so as to overcome the diffusion limitations for petroleum bottoms HDS but limited macroporosity to limit poisoning of the catalyst pellet interior.

It is one object of this invention to provide a process for the catalytic hydrotreatment of a sulfur and metal-containing hydrocarbon feed, the process achieving improved levels of HDS, HDN, and HDNi in the total product. It is another object of this invention to provide a process for the catalytic hydrotreatment of a sulfur and metal-containing hydrocarbon feed, the process achieving improved levels of HDS and HDNi in the fraction of the hydrotreated product having a boiling point greater than 1000° F.

It is one feature of the process of the instant invention that the catalyst employed has a specified micropore and macropore distribution such that micropores having diameters of 100-160A constitute 70-85% TPV and macropores having diameters of greater than 250A constitute 5.5-22.0% TPV of the catalyst. It is another feature of the process of the instant invention that the catalyst employed is contacted with the hydrocarbon feed and hydrogen in such a manner as to expose the catalyst to a uniform quality of feed, and to maintain the catalyst at isothermal temperatures.

It is one advantage of the process of the instant invention that improved HDS and HDNi levels are achieved for both total hydrocarbon product and hydrocarbon product having a boiling point greater than 1000° F. It is another advantage of the process of the instant invention that levels of HDS, HDN, and HDNi remain consistently higher with increasing age of catalyst as compared with hydrotreatment processes employing a conventional catalyst composition.

This invention is directed to a process for the catalytic hydrotreatment of a hydrocarbon feed, preferably a petroleum feedstock. Petroleum feedstocks which may be treated via the process of the instant invention include naphthas, distillates, gas oils, petroleum cokes, residual oils, and vacuum residua. A petroleum feedstock typical of those subject to catalytic hydrotreatment by the process of the instant invention is an Arabian Medium/Heavy Vacuum Resid as set forth in Table I, below.

TABLE I

| Typical Petroleum Feedstock (Arabian Medium/Heavy Vacuum Resid) | |
|---|---|
| API Gravity | 4.8 |
| 1000° F. +, vol % | 87.5 |
| 1000° F. +, wt % | 88.5 |
| Sulfur, wt % | 5.0 |
| Total Nitrogen, wppm | 4480 |
| Hydrogen, wt % | 10.27 |
| Carbon, wt % | 84.26 |
| Alcor MCR, wt % | 22.2 |
| Kinematic Viscosity, cSt | |
| @ 212F | 2430 |
| @ 250F | 410 |
| @ 300F | 117 |
| Pour Point, °F. | 110 |
| n-C$_5$ Insolubles, wt % | 28.4 |
| n-C$_7$ Insolubles, wt % | 9.96 |
| Toluene Insolubles, wt % | 0.02 |
| Asphaltenes, wt % | 9.94 |
| Metals, wppm | |
| Ni | 49 |
| V | 134 |
| Fe | 10 |
| Cu | 3 |
| Na | 49 |
| Chloride, wppm | 28 |

The process of the instant invention employs a catalyst composition comprising 3.0–5.0, preferably 3.0–3.5 wt. % of an oxide of a Group VIII metal, preferably nickel or cobalt, most preferably NiO, 14.5–24.0, preferably 14.5–15.5 wt. % of an oxide of a Group VIB metal, preferably tungsten or molybdenum, most preferably MoO$_3$, and 0–2.0, preferably less than 0.2 wt. % of an oxide of phosphorus, preferably P$_2$O$_5$, all supported on a porous alumina support, most preferably a gamma-alumina support. Group VIB and Group VIII as referred to herein are Group VIB and Group VIII of the Periodic Table of Elements. The Periodic Table of Elements referred to herein is found on the inside cover of the CRC Handbook of Chemistry and Physics, 55th Ed. (1974–75). Other oxide compounds which may be found in such a catalyst composition include SiO$_2$ (present in less than 2.5 wt. %), SO$_4$ (present in less than 0.8 wt. %), and Na$_2$O (present in less than 0.1 wt. %). The abovedescribed alumina support may be purchased or prepared by methods well known to those skilled in the art. Similarly, the support material may be impregnated with the requisite amounts of the abovedescribed Group VIB and VIII metal oxides and phosphorus oxide (if employed) via conventional means known to those skilled in the art.

A necessary and essential feature of the process of the instant invention is the specified pore size distribution of the catalyst employed. It is well known to those skilled in the art that the activity of a given catalyst is proportional to its surface area and active site density. Ordinarily, a catalyst with a large proportion of micropores will have a higher surface area and a corresponding higher intrinsic activity, whereas a catalyst having a large proportion of macropores will have a lower surface area and a corresponding lower intrinsic activity. However, when hydrotreating certain hydrocarbon feedstocks such as petroleum feedstocks, particularly vacuum residua, the observed catalyst reaction rates for catalysts with a large proportion of small diameter pores are low due to diffusional limitations of the small pores, as well as pore blockage caused by accumulating carbon and metals as the catalyst ages. This problem is particularly acute in terms of achieving desired HDS and HDM levels for hydrotreated petroleum resid product having a boiling point greater than 1000° F.

The incorporation of large amounts of macroporosity into catalysts somewhat alleviates the problems of diffusional limitations and pore blockage. However, with large amounts of macroporosity other problems often result when such catalysts are employed in hydrotreating of petroleum feedstocks such as vacuum residua. For example, larger pores provide better access to the catalyst interior and therefore a higher probability of metal-containing and/or high molecular weight compounds poisoning the catalyst, thereby reducing the catalyst activity.

It is evident that the abovedescribed conflicting demands placed upon petroleum feedstock hydrotreatment catalyst compositions make it difficult to employ a single catalyst in a hydrotreatment process which will achieve effective levels of HDS, HDN, and HDNi. However, the catalyst employed in the process of the instant invention is capable of achieving such results as the prescribed catalyst has a limited macroporosity sufficient to overcome the diffusion limitations for hydrotreatment of the largest molecules but not so much as to allow poisoning of the catalyst pellet interiors. The catalyst employed is characterized by having a total surface area of 150–210 m$^2$/g, preferably 180–210 m$^2$/g, and a TPV of 0.50–0.75 cc/g, preferably 0.60–0.70 m$^2$/g, with a pore size distribution such that micropores having diameters of 100–160A constitute 70–85% TPV of the catalyst, and macropores having diameters of greater than 250A constitute 5.5–22.0%, preferably 7–16% TPV of the catalyst. In such a catalyst, it is particularly preferred that the pore volume of micropores having diameters less than 100A be limited to 5–15% TPV, preferably 7.5–13.0% TPV of the catalyst and that the pore volume of macropores having diameters of 500–10,000A constitute 2–12% TPV, preferably 2.5–5.0% TPV.

Catalyst Examples A, B, and C, as described in Table II below, are catalysts which may be employed in the process of the instant invention. Examples D, E, and F are commercial catalysts typically used in hydrotreating petroleum resid oils.

TABLE II

| CATALYST PROPERTIES | | | | | | |
|---|---|---|---|---|---|---|
|  | Example A | Example B | Example C | Example D | Example E | Example F |
| Chemical Composition (wt. %): | | | | | | |
| MoO$_3$ | 14.5–15.5 | 14.5–15.5 | 14.5–15.5 | 11.5–14.5 | 15.2 | 16.6–19.5 |
| NiO | 3.0–3.5 | 3.0–3.5 | 3.0–3.5 | 3.2–4.0 | 2.9 | 2.9–3.6 |
| SiO$_2$ | ≦2.5 | ≦2.5 | ≦2.5 | ≦1.0 | 1.6 | ≦1.0 |
| SO$_4$ | ≦0.8 | ≦0.8 | ≦0.8 | ≦0.8 | 0.3 | ≦1.0 |
| Na$_2$O | ≦0.1 | ≦0.1 | ≦0.1 | ≦0.05 | 0.01 | ≦1.0 |
| P$_2$O$_5$ | 1.5–1.9 | ≦0.2 | ≦0.2 | ≦0.2 | 0.7 | — |
| Surface Area (m$^2$/g) | 182 | 203 | 189 | 314 | 180 | 229 |
| TPV (cc/g)* | 0.686 | 0.647 | 0.672 | 0.739 | 0.544 | 0.69 |
| PV<100A (% TPV)* | 6.7 | 12.5 | 9.4 | 58.2 | 12.7 | 35 |
| PV 100–160A (% TPV)* | 70 | 73 | 82 | 4 | 81 | 34 |
| PV>250A (% TPV)* | 15.5 | 8.7 | 5.7 | 34.1 | 3.9 | 22 |
| PV 500–10,000 A (% TPV)* | 10.2 | 4.6 | 3.0 | 29.8 | 1.5 | 15.9 |

*Pore Structure Information determined using Micromeritics Autopore 9220 Mercury Porosimetry Instrument.

A second necessary and essential feature of the process of the instant invention is that the abovedescribed catalyst must be contacted with the hydrocarbon feed in such a manner as to insure that the catalyst particles are maintained at isothermal conditions and exposed to a uniform quality of feed. Thus, process configurations such as fixed and moving catalyst bed arrangements are specifically precluded, as such reactor bed arrangements fail to insure the necessary isothermal conditions and exposure to a uniform quality of feed. Preferred means for achieving such isothermal conditions and exposure of catalyst to a uniform quality of feed include contacting the feed with catalyst in a single continuous stirred tank reactor (CSTR), a single ebullated bed reactor, or in a series of 2–5 CSTR's or ebullated bed reactors, with ebullated bed reactors being particularly preferred.

In one particularly preferred embodiment of the process of the instant invention, a sulfur- and metal-containing hydrocarbon feedstock is catalytically hydrotreated with the abovedescribed catalyst using the H-OIL Process configuration. H-OIL is a proprietary ebullated bed process (co-owned by Hydrocarbon Research, Inc. and Texaco Development Corp.) for the catalytic hydrogenation of residua and heavy oils to produce upgraded distillate petroleum products. The ebullated bed system operates under essentially isothermal conditions and allows for exposure of catalyst particles to a uniform quality of feed.

It is well known to those skilled in the art that hydrotreatment of a sulfur- and metal-containing hydrocarbon feedstock such as vacuum resid typically yields a mixture of converted (i.e. hydrocracked) liquid products which typically are upgraded distillate products with boiling points below 1000° F. and unconverted (i.e.

non-hydrocracked) material typically having a boiling point in excess of 1000° F. It is also well known to those skilled in the art that catalytic hydrotreatment of a given feedstock often leads to a high degree of HDS for the converted liquid portion of the product (i.e. that portion of the treated product having a boiling point below 1000° F.), but that HDS levels for unconverted material (i.e. that portion of the treated product having a boing point greater than 1000° F.) are inadequate, therefore requiring further treatment of the unconverted material at additional expense. However, the process of the instant invention is particularly advantageous in that it achieves a high degree of HDS for both hydrocracked and non-hydrocracked liquid products resulting from treatment of hydrocarbon feedstock with the process.

The process of the instant invention as well as hydrotreatment processes employing commercially available catalysts were evaluated using a Robinson Reactor. A Robinson Reactor is a CSTR which evaluates catalyst deactivation rate at conditions simulating the first stage of a two-stage H-OIL ebullated bed unit. The feedstock used was an Arabian Med/Hvy Vac. Resid of the type disclosed in Table I, and the evaluations were typically carried out for 3–4 weeks (up to a catalyst age of about 4 bbl/lb). The Robinson Reactor run conditions were as follows:

| Temperature | 770° F. |
| Pressure | 2250 psig |
| Chargestock | Arab Med/Hvy Vac. Resid |
| Space Velocity | 0.56 hr$^{-1}$ |
| Catalyst Charge | 30 g |
| Nominal Conversion of + 1000° F. B.P. to Distillate | 41% |

Sufficient product was collected in the reactor to allow for the evaluation of sulfur, nitrogen, nickel, and vanadium content of the total product, as well as the sulfur content in various boiling point (B.P.) fractions (e.g.—650° F. B.P., 650°–1000° F. B.P., and +1000° F. B.P.) of the hydrotreated product.

Figure 2:
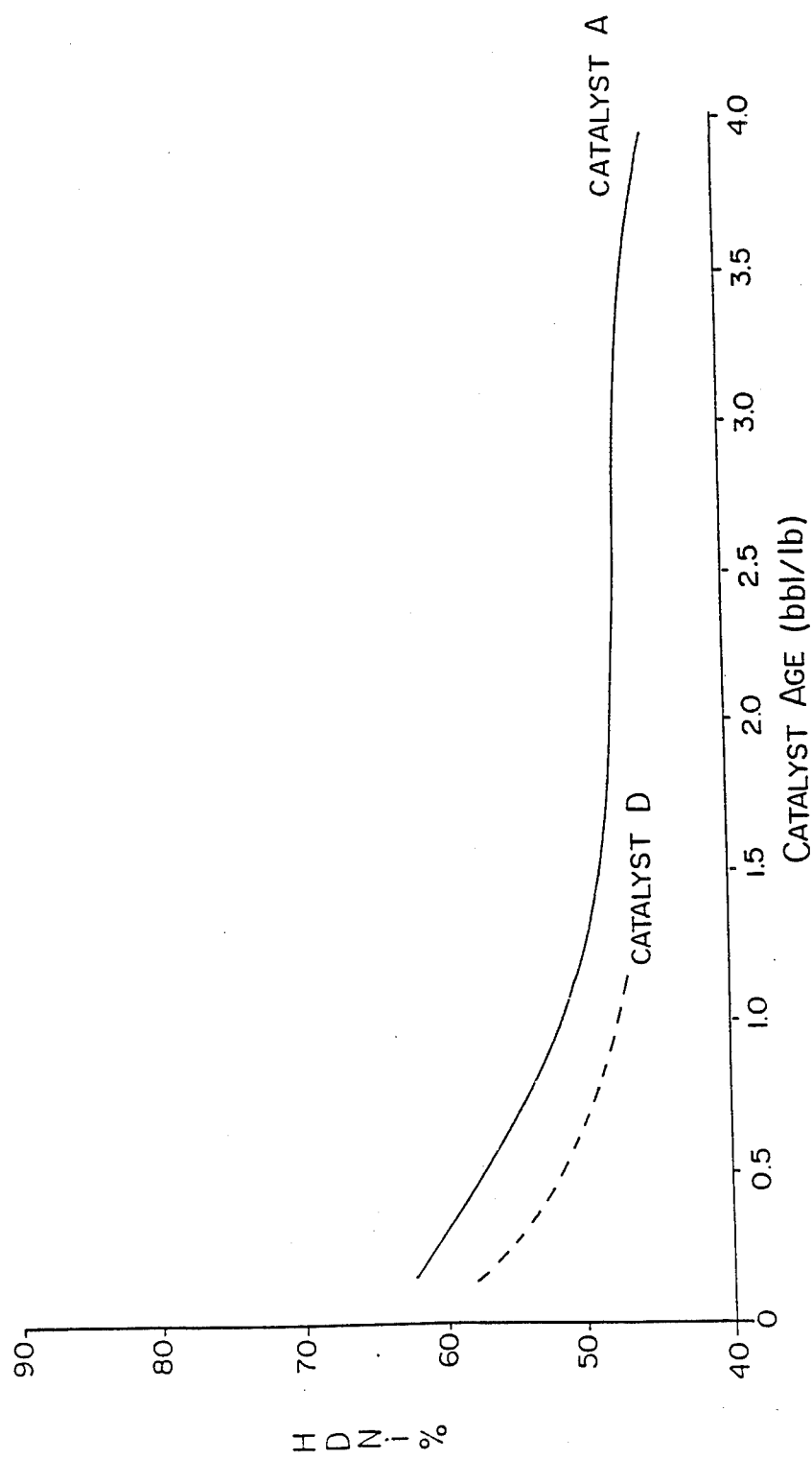
FIG. 2 (Robinson Reactor Data HDNi of Total Liquid Product) illustrates data obtained comparing removal of nickel compounds (HDNi) in the total liquid product of a hydrotreated hydrocarbon feedstock via a process employing a commercial hydrotreatment catalyst and the process of the instant invention.
Figure 3:
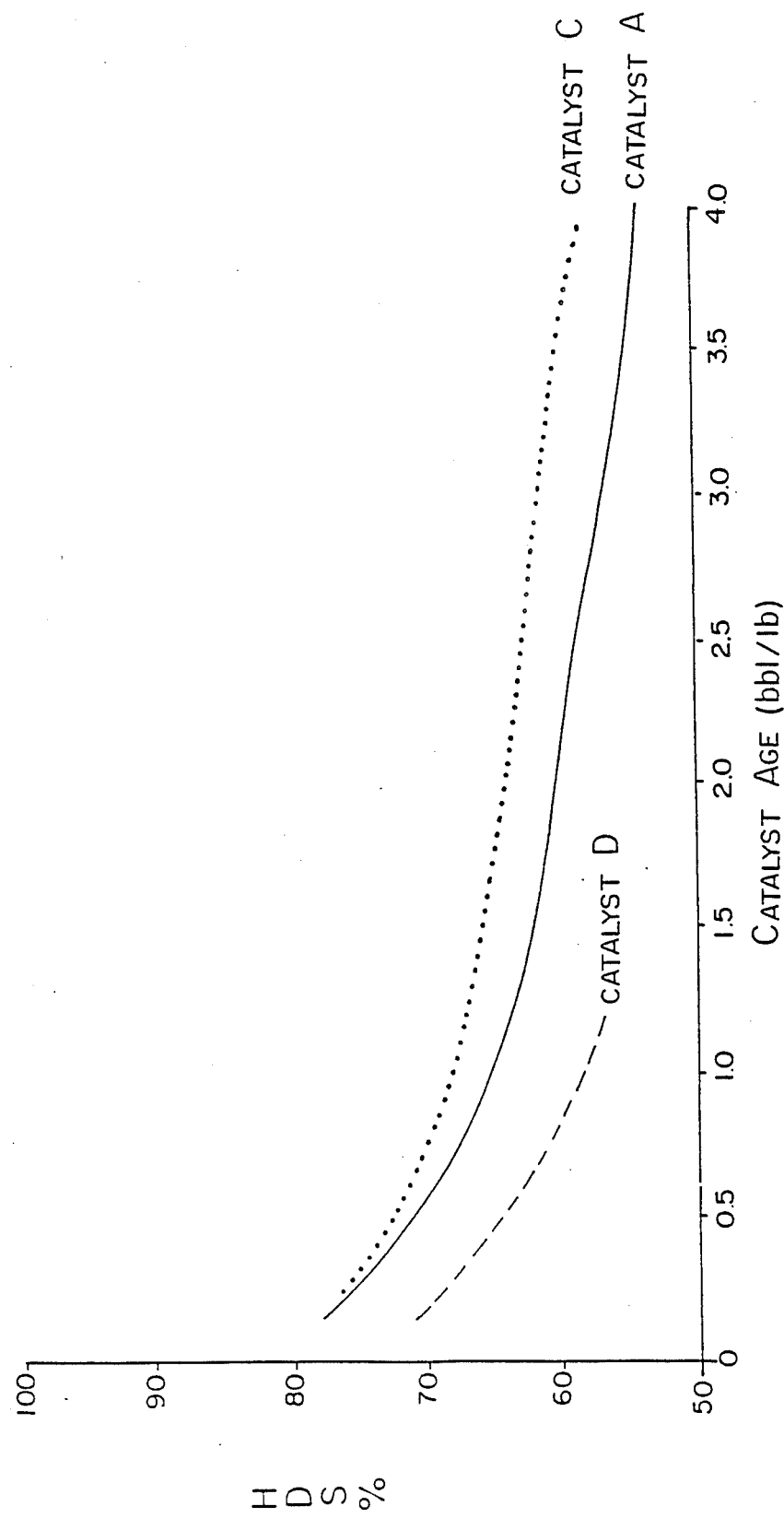
FIG. 3 (Robinson Reactor Data Corrected HDS of Total Liquid Product) illustrates data obtained comparing hydrodesulfurization (HDS) of total liquid product of a hydrotreated hydrocarbon feedstock obtained via a process employing a commercial hydrotreatment catalyst and the process of the instant invention.
Figure 4:
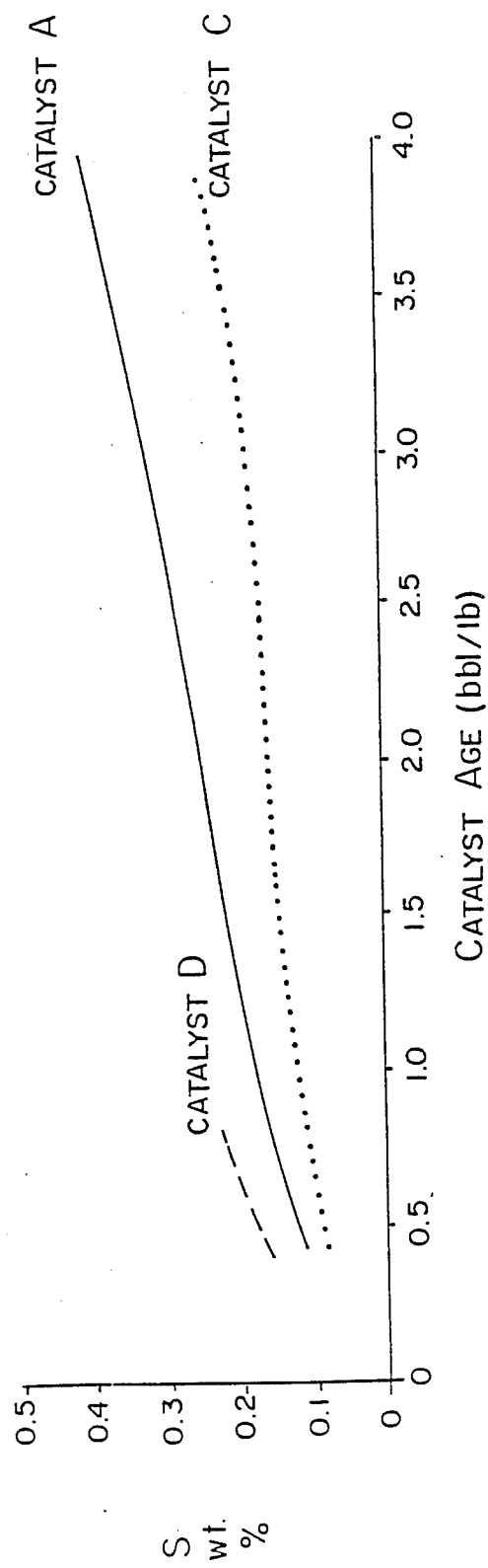
FIG. 4 (Robinson Reactor Data Sulfur Content of −650° F. B. P. Fraction) illustrates data obtained comparing hydrodesulfurization (HDS) of the fraction of product of a hydrotreated hydrocarbon feedstock boiling at a temperature below 650° F., the hydrotreatment achieved via a process employing a commercial hydrotreatment catalyst and two embodiments of processes of the instant invention.
Figure 5:
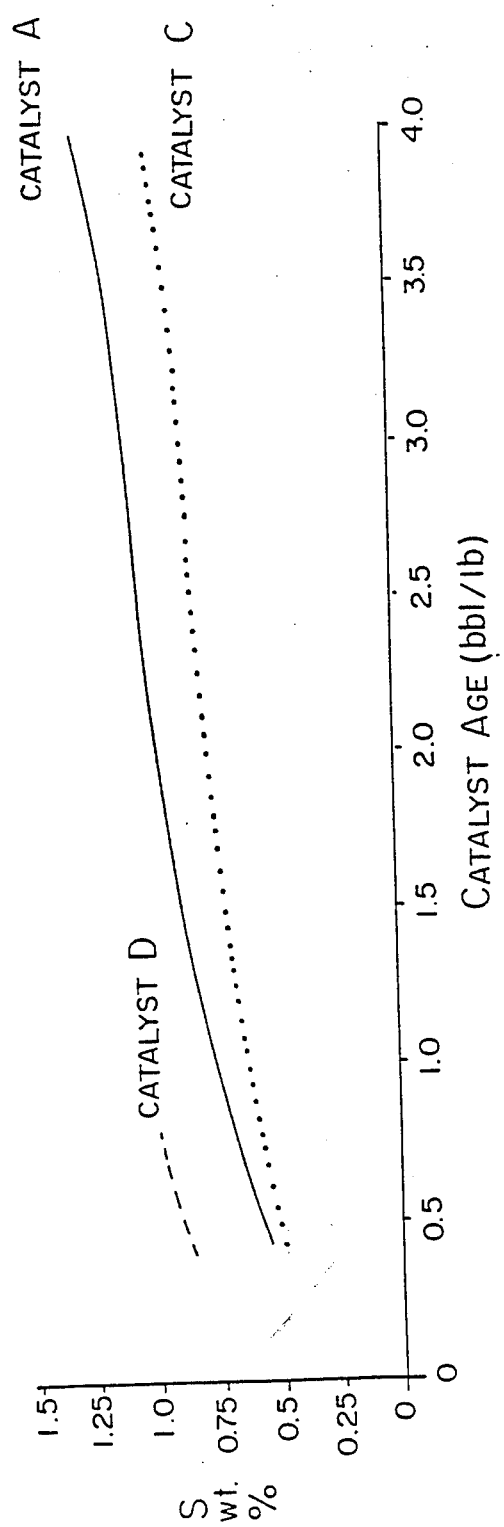
FIG. 5 (Robinson Reactor Data Corrected Sulfur Content of +1000° F. G. P. Fraction) illustrates data obtained comparing hydrodesulfurization (HDS) of the fraction of product of a hydrotreated hydrocarbon feedstock boiling at a temperature range of 650°–1000° F., the hydrotreatment achieved via a process employing a commercial hydrotreatment catalyst and two embodiments of processes of the instant invention.
Figure 6:
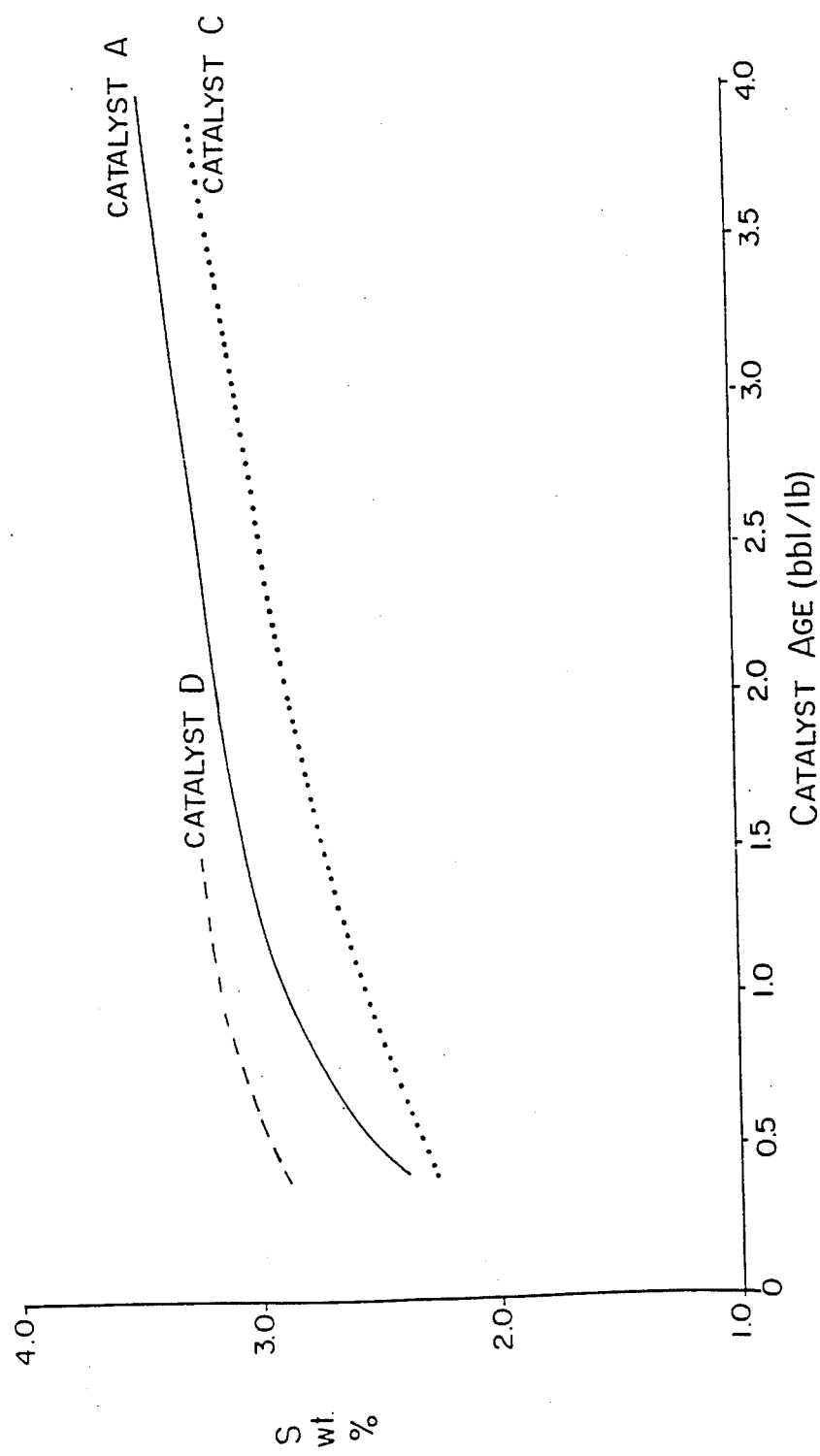
FIG. 6 (Robinson Reactor Data Corrected Sulfur Content of +1000° F. B. P. Fraction) illustrates data obtained comparing hydrodesulfurization (HDS) of the fraction of product of a hydrotreated hydrocarbon feedstock boiling at a temperature greater than 1000° F., the hydrotreatment achieved via a process employing a commercial hydrotreatment catalyst and two embodiments of processes of the instant invention.

As illustrated by FIGS. 1, 2, and 3, respectively, the process of the instant invention (as embodied by a Robinson Reactor employing Catalyst A) was effective in achieving higher levels of nitrogen removal (HDN), nickel removal (HDNi), and sulfur removal (HDS) of total hydrotreated liquid product as a function of catalyst age than a process employing the Robinson Reactor and a commercial catalyst (Catalyst D). As illustrated by FIGS. 4 and 5, respectively, the process of the instant invention (as embodied by a Robinson Reactor employing Catalysts A and C respectively) was more effective in reducing the sulfur concentration (in wt.%) of the hydrotreated liquid product having boiling points below 650° F. and 650° F.–1000° F., respectively, than a process employing the Robinson Reactor and a commercial catalyst (Catalyst D). As illustrated by FIG. 6, the process of the instant invention (as embodied by a Robinson Reactor employing Catalysts A and C respectively) was more effective in reducing the sulfur concentration (in wt.%) of the non-hydrocracked liquid product having a boiling point greater than 1000° F. than a process employing the Robinson Reactor and a commercial catalyst (Catalyst D).

From FIGS. 1 and 2, respectively, it is clear that the process of the instant invention achieved a higher degree of nitrogen and nickel removal for the total hydrotreated liquid product than was achieved in the process employing the Robinson Reactor and a commercial hydrotreatment catalyst.

Figure 7:
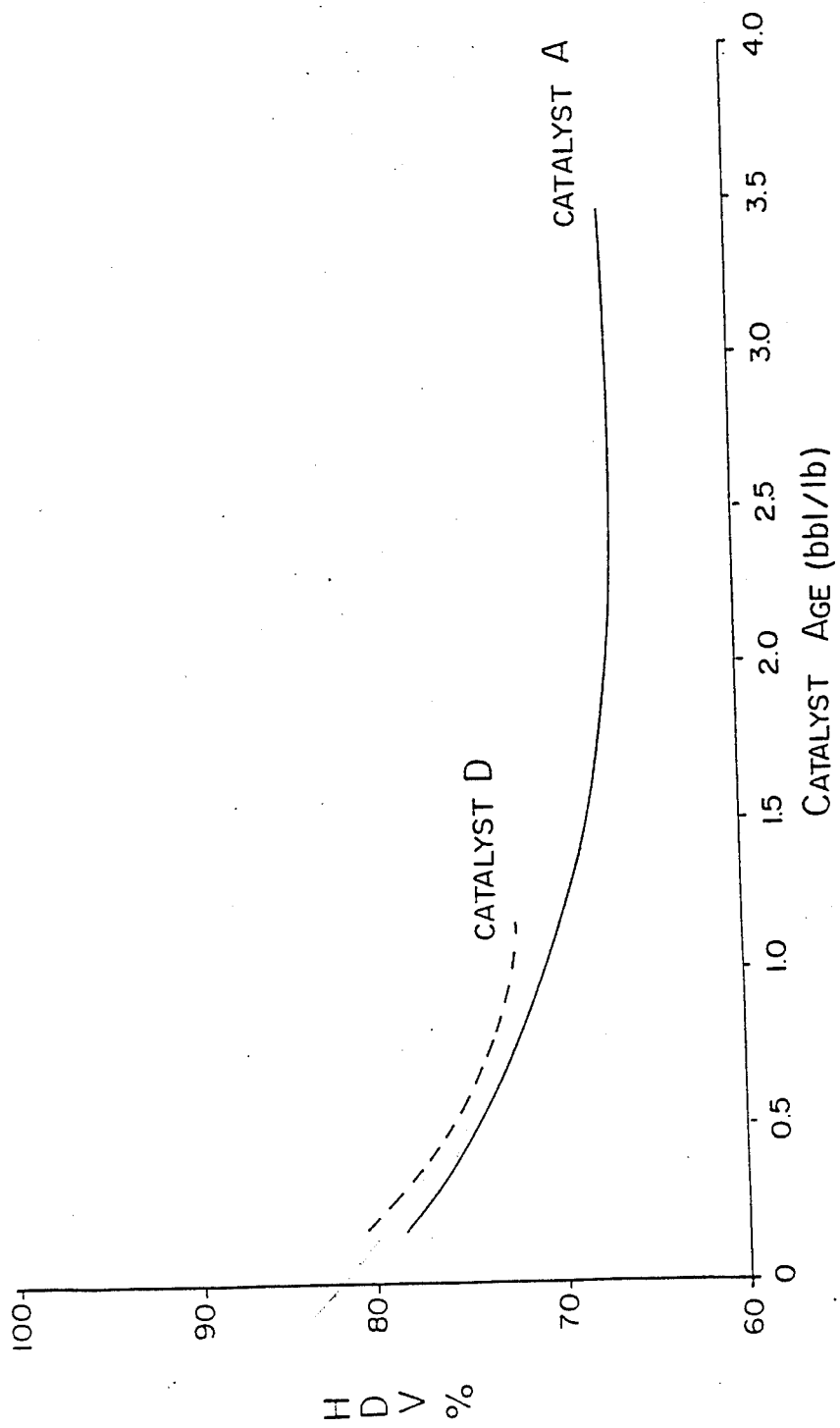
FIG. 7 (Robinson Reactor Data HDV of Total Liquid Product) illustrates data obtained comparing the removal of vanadium compounds (HDV) from the total liquid product of a hydrotreated hydrocarbon feedstock obtained via a process employing a commercial hydrotreatment catalyst and the process of the instant invention.

From FIGS. 3, 4, 5, and 6, it is clear that the process of the instant invention achieved a higher degree of sulfur removal for both the hydrocracked and non-hydrocracked portions of the product than was achieved in the process employing the Robinson Reactor and a commercial catalyst. However, as illustrated by FIG. 7, the process of the instant invention (as embodied by a Robinson Reactor employing Catalyst A) was less effective in removal of vanadium metal compounds than a process employing the Robinson Reactor and a commercial catalyst (Catalyst D). Thus, in situations where a petroleum resid feedstock has a relatively high vanadium content, another embodiment of the process of the instant invention is to employ 2–5 CSTR's or ebullated bed reactors with one or more reactors employing the prescribed catalyst and one or more reactors employing a conventional hydrotreatment catalyst such as Catalyst D.

Figure 8:
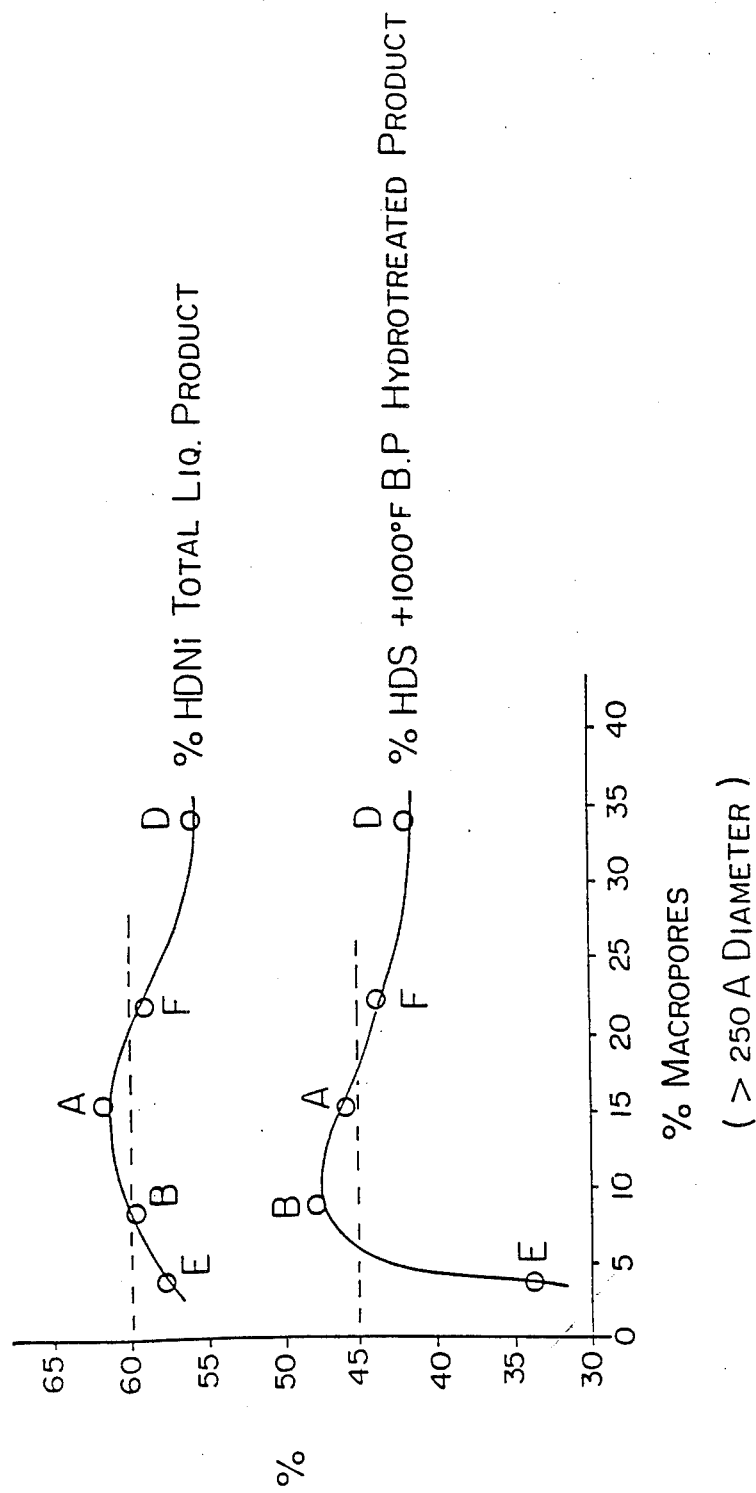
FIG. 8 (Robinson Reactor Data optimum Macroporosity for % HDNi (Total Liq. Product) & % HDS (+1000° F. B. P. Product) illustrates data obtained which compares (i) nickel removal (HDNi) of total liquid product and (ii) sulfur removal (HDS) for the +1000° F. boiling point fraction of a hydrotreated feedstock as a function of the degree of macroporosity of the catalyst employed.

FIG. 8 illustrates that it is a necessary and essential feature of the process of the instant invention that the catalyst employed has a pore size distribution such that macropores having diameters of greater than 250A constitute 5.5–22.0%, preferably 7–16% TPV of the catalyst. In FIG. 8, HDNi (i.e. nickel removal) of total liquid product and % HDS (+1000.F. B.P. fraction) (i.e. sulfur removal in the non-hydrocracked product boiling above 1000° F.) are plotted as a function of the percentage of macroporosity of the catalyst employed in the Robinson Reactor. The Robinson Reactor conditions were as follows: temperature=770° F.; space velocity=0.56 hr$^{-1}$; catalyst age span=0.1–1.5 bbl/lb; nominal conversion of +1000° F. B.P. to distillate=41%.

It is clear from FIG. 8 that acceptable % HDNi values (i.e. defined herein as values above 60% HDNi) were obtained when catalyst macroporosity was in the range of about 7.5–22.0% TPV. Similarly, acceptable % HDS (+1000° F. B.P. fraction) values (defined herein as values above 45% HDS) were obtained when catalyst macroporosity was in the range of 5.5–18.0% TPV. Therefore, to achieve both acceptable % HDNi and % HDS values, the catalyst employed in the process of the instant invention must have a pore size distribution such that macropores having diameters greater than 250A constitute about 5.5–22.0% TPV. Optimum values for both % HDNi and % HDS, as illustrated by FIG. 8, are obtained where such macropores constitute about 7.0–16.0% TPV.

Although this invention has been illustrated by reference to specific embodiments, it will be apparent to those skilled in the art that various changes and modifications may be made which clearly fall within the scope of this invention.

The invention claimed is:

1. A process for the hydrotreatment of a sulfur and metal-containing hydrocarbon feed which comprises contacting said feed with hydrogen and a catalyst in a manner such that the catalyst is maintained at isothermal conditions and is exposed to a uniform quality of feed, where said catalyst has a composition comprising 3.0–5.0 wt. % of an oxide of a Group VIII metal, 14.5–24.0 wt. % of an oxide of a Group VIB metal and 0–2.0 wt. % of an oxide of phosphorus supported on a porous alumina support, and said catalyst is further characterized by having a total surface area of 150–210 m²/g and a total pore volume of 0.50–0.75 cc/g with a pore diameter distribution such that micropores having diameters of 100–160A constitute 70–85% of the total pore volume of said catalyst and macropores having diameters of greater than 250A constitute 5.5–22.0% of the total pore volume of said catalyst.

2. The process of claim 1, where said catalyst comprises 3.0–3.5 wt. % of an oxide of a Group VIII metal, 14.5–15.5 wt. % of an oxide of a Group VIB metal, and 0–0.20 wt. % of an oxide of phosphorus supported on a porous alumina support.

3. The process of claim 1, where said Group VIII metal is selected from the group consisting of nickel and cobalt.

4. The process of claim 1, where said Group VIB metal is selected from the group consisting of tungsten and molybdenum.

5. The process of claim 1, where said catalyst has a total surface area of 180–210 m²/g and a total pore volume of 0.60–0.70 cc/g with a pore diameter distribution such that micropores having diameters of 100–160A constitute 70–85% of the total pore volume of said catalyst and macropores having diameters greater than 250A constitute 7–16% of the total pore volume of said catalyst.

6. A process for the hydrotreatment of a sulfur and metal-containing hydrocarbon feed which comprises contacting said feed with hydrogen and a catalyst in a manner such that the catalyst is maintained at isothermal conditions and is exposed to a uniform quality of feed, where said catalyst has a composition comprising 3.0–3.5 wt. % NiO, 14.5–15.5 wt. % MoO₃, and 0–0.2 wt. % P₂O₅ supported on a porous alumina support, and said catalyst is further characterized by having a total surface area of 180–210 m²/g and a total pore volume of 0.60–0.70 cc/g with a pore diameter distribution such that micropores having diameters of 100–160A constitute 70–85% of the total pore volume of said catalyst and macropores having diameters greater than 250A constitute 7–16% of the total pore volume of said catalyst.

7. A process for the hydrodesulfurization of the portion of a hydrotreated hydrocarbon feed having a boiling point greater than 1000° F., which comprises contacting said feed with hydrogen and a catalyst in a manner such that the catalyst is maintained at isothermal conditions and is exposed to a uniform quality of feed, where said catalyst has a composition comprising 3.0–5.0 wt. % of an oxide of a Group VIII metal, 14.5–24.0 wt. % of an oxide of a Group VIB metal and 0–2.0 wt. % of an oxide of phosphorus supported on a porous alumina support, and said catalyst is further characterized by having a total surface area of 150–210 m²/g and a total pore volume of 0.50–0.75 cc/g with a pore diameter distribution such that micropores having diameters of 100–160A constitute 70–85% of the total pore volume of said catalyst and macropores having diameters of greater than 250A constitute 5.5–22.0% of the total pore volume of said catalyst.

8. The process of claim 7, where said catalyst comprises 3.0–3.5 wt. % of an oxide of a Group VIII metal, 14.5–15.5 wt. % of an oxide of a Group VIB metal, and 0–0.20 wt. % of an oxide of phosphorus supported on a porous alumina support.

9. The process of claim 7, where said Group VIII metal is selected from the group consisting of nickel and cobalt.

10. The process of claim 7, where said Group VIB metal is selected from the group consisting of tungsten and molybdenum.

11. The process of claim 7, where said catalyst has a total surface area of 180–210 m2/g and a total pore volume of 0.60–0.70 cc/g, with a pore diameter distribution such that micropores having diameters of 100–160A constitute 70–85% of the total pore volume of said catalyst and macropores having diameters greater than 250A constitute 7–16% of the total pore volume of said catalyst.

12. A process for the hydrodesulfurization of the portion of a hydrotreated hydrocarbon feed having a boiling point greater than 1000° F., which comprises contacting said feed with hydrogen and a catalyst in a manner such that the catalyst is maintained at isothermal conditions and is exposed to a uniform quality of feed, where said catalyst has a composition comprising 3.0–3.5 wt. % NiO, 14.5–15.5 wt. % MoO₃, and 0–0.2 wt. % P₂O₅ supported on a porous alumina support, and said catalyst is further characterized by having a total surface area of 180–210 m²/g and a total pore volume of 0.60–0.70 cc/g with a pore diameter distribution such that micropores having diameters of 100–160A constitute 70–85% of the total pore volume of said catalyst and macropores having diameters greater than 250A constitute 7–16% of the total pore volume of said catalyst.

13. A process for the hydrotreatment of a sulfur and metal-containing hydrocarbon feed which comprises contacting said feed with hydrogen and a catalyst in a manner such that the catalyst is maintained at isothermal conditions and is exposed to a uniform quality of feed, where said catalyst has a composition comprising 3.0–3.5 wt. % NiO, 14.5–15.5 wt. % MoO₃, and 0–0.2 wt. % P₂O₅ supported on a porous alumina support, and said catalyst is further characterized by having a total surface area of 180–210 m²/g and a total pore volume of 0.60–0.70 cc/g with a pore diameter distribution such that micropores having diameters less than 100A constitute 7.5–13.0% of the total pore volume of said catalyst, micropores having diameters of 100–160A constitute 70–85% of the total pore volume of said catalyst and macropores having diameters greater than 250A constitute 7–16% of the total pore volume of said catalyst, with macropores having diameters of 500–10,000A constituting 2.5–5.0% of the total pore volume of said catalyst.

14. A process for the hydrodesulfurization of the portion of a hydrotreated hydrocarbon feed having a boiling point greater than 1000° F., which comprises contacting said feed with hydrogen and a catalyst in a manner such that the catalyst is maintained at isothermal conditions and is exposed to a uniform quality of feed, where said catalyst has a composition comprising 3.0–3.5 wt. % NiO, 14.5–15.5 wt. % MoO₃, and 0–0.2 wt. % P₂O₅ supported on a porous alumina support, and said catalyst is further characterized by having a total surface area of 160–200 m²/g and a total pore volume of 0.60–0.70 cc/g with a pore diameter distribution such that micropores having diameters less than 100A constitute 7.5–13.0% of the total pore volume of said catalyst, micropores having diameters of 100–160A constitute 70–85% of the total pore volume of said catalyst and macropores having diameters greater than 250A constitute 7–16% of the total pore volume of said catalyst, with macropores having diameters of 500–10,000A constituting 2.5–5.0% of the total pore volume of said catalyst.

15. The process of any one of claims 1–14, where said feed is contacted with said catalyst in a single continuous stirred tank reactor.

16. The process of any one of claims 1–14, where said feed is contacted with said catalyst in a single ebullated bed reactor.

17. The process of any one of claims 1–14, where said feed is contacted with said catalyst in a series of 2–5 ebullated bed reactors.

18. The process of any one of claims 1–14, where said feed is contacted with said catalyst in a series of 2–5 continuous stirred tank reactors.

* * * * *